United States Patent
Sherwood et al.

(10) Patent No.: US 9,830,115 B2
(45) Date of Patent: *Nov. 28, 2017

(54) PRINTER INTERFACE FOR PRINTING DATA AND/OR RECEIPTS TO AND FROM HAND HELD DEVICES

(71) Applicants: Mary Lynn Sherwood, Escondido, CA (US); Bruce Lawrence Hall, Escondido, CA (US)

(72) Inventors: Mary Lynn Sherwood, Escondido, CA (US); Bruce Lawrence Hall, Escondido, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/793,676

(22) Filed: Jul. 7, 2015

(65) Prior Publication Data

US 2015/0309757 A1 Oct. 29, 2015

Related U.S. Application Data

(63) Continuation of application No. 12/315,129, filed on Nov. 29, 2008, now Pat. No. 9,098,213.

(60) Provisional application No. 61/004,828, filed on Nov. 30, 2007.

(51) Int. Cl.
*G06K 19/00* (2006.01)
*G06F 3/12* (2006.01)
*G06F 3/08* (2006.01)

(52) U.S. Cl.
CPC .............. *G06F 3/1222* (2013.01); *G06F 3/08* (2013.01); *G06F 3/1209* (2013.01); *G06F 3/1231* (2013.01); *G06F 3/1236* (2013.01); *G06F 3/1284* (2013.01); *G06F 3/1288* (2013.01); *G06F 3/1292* (2013.01)

(58) Field of Classification Search
USPC .................. 235/435, 439–441, 451, 487, 492
See application file for complete search history.

(56) References Cited

U.S. PATENT DOCUMENTS

| | | |
|---|---|---|
| 5,239,166 A | 8/1993 | Graves |
| 5,739,512 A | 4/1998 | Tognazzini |
| 6,745,936 B1 | 6/2004 | Movalli et al. |
| 6,927,869 B1 * | 8/2005 | Simpson ............... G06K 15/00 358/1.14 |
| 9,098,213 B1 * | 8/2015 | Stewart ..................... G06F 3/08 |
| 2003/0115135 A1 | 6/2003 | Sarfraz et al. |
| 2005/0009560 A1 * | 1/2005 | Cavill ................ H04N 1/00281 455/556.1 |
| 2007/0069013 A1 | 3/2007 | Seifert et al. |
| 2007/0182984 A1 | 8/2007 | Ragnet et al. |
| 2007/0290031 A1 * | 12/2007 | Singh ..................... G06Q 20/18 235/375 |

(Continued)

*Primary Examiner* — Matthew Mikels
(74) *Attorney, Agent, or Firm* — Jonathan Kidney; CKR Law LLP

(57) ABSTRACT

Previous printers were designed to print a paper copy of data and/or receipts which causes a disconnect with modern day data manipulation. This printer interface can print data to and receive data from the internet and hand held devices which will open up extremely fast data exchange and data manipulation for consumers, cities, states and the federal government without the expense of having to purchase complete new systems. By simply changing out an old printer we can connect all old computer systems with modern day systems that now have the ability to manipulate data automatically.

20 Claims, 4 Drawing Sheets

(56) References Cited

U.S. PATENT DOCUMENTS

2008/0102892 A1* 5/2008 Louks ............... H04N 1/00132
 455/557
2009/0006151 A1 1/2009 Zarghami et al.

* cited by examiner

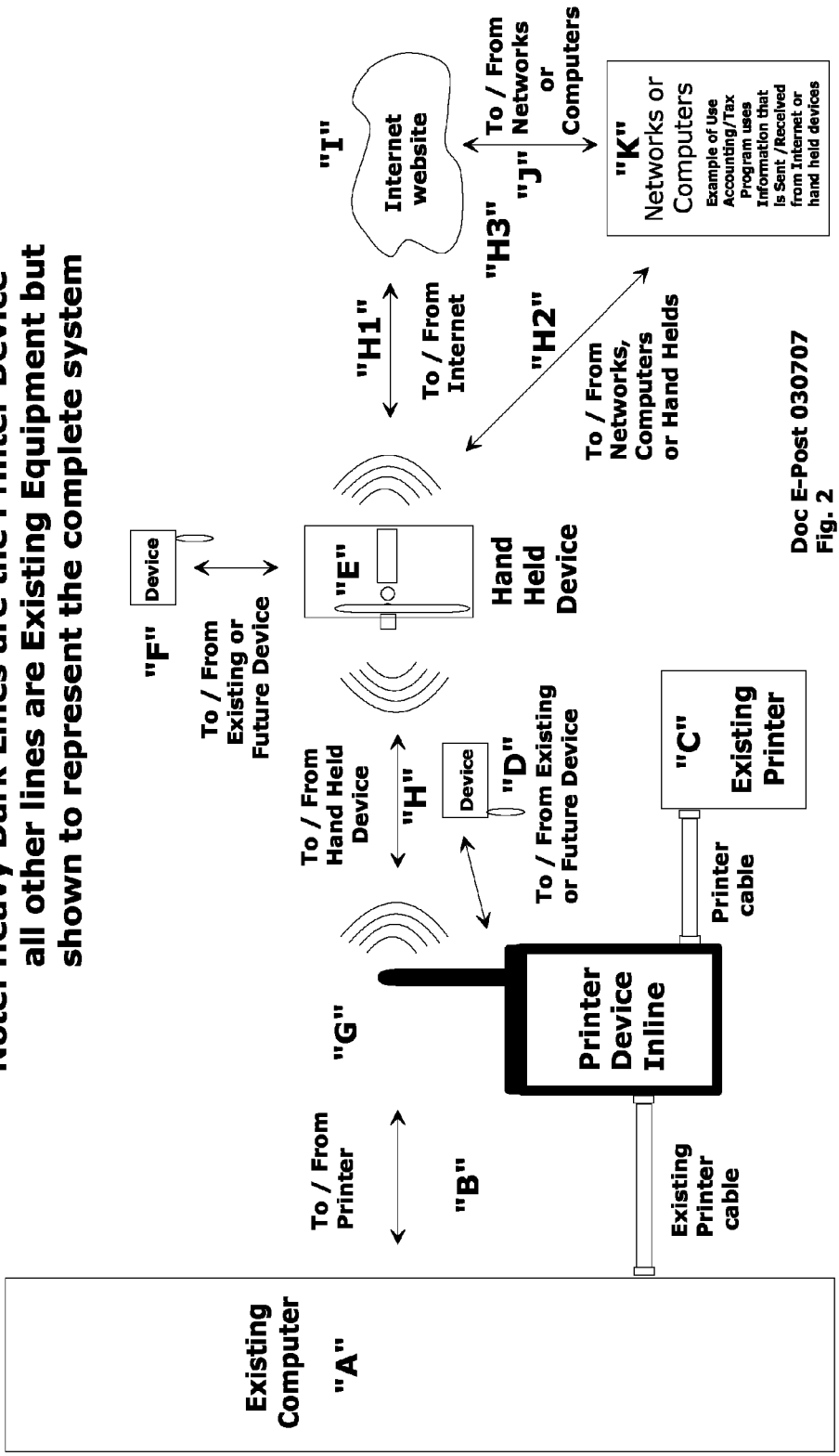

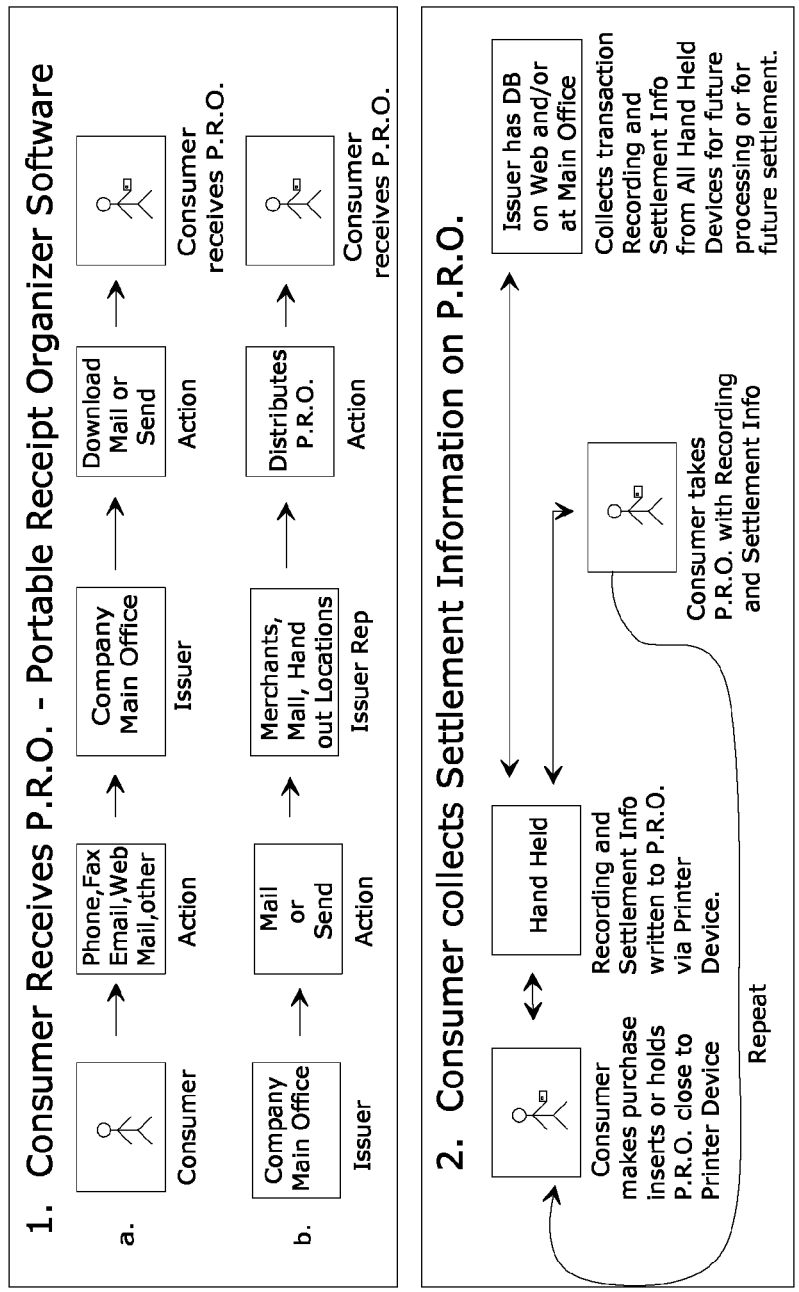

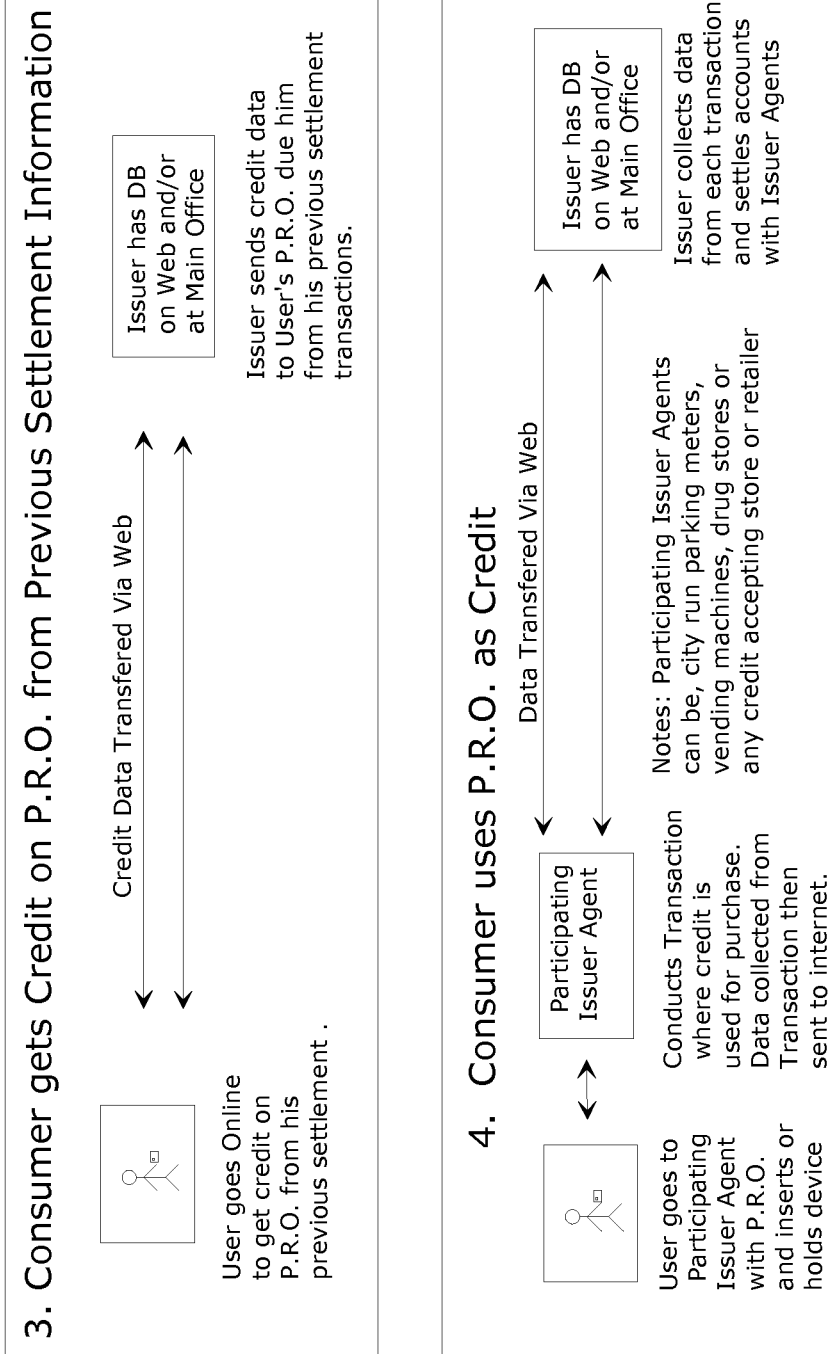

PRINTER INTERFACE FOR PRINTING DATA AND/OR RECEIPTS TO AND FROM HAND HELD DEVICES

CROSS-REFERENCE

This application claims the benefit of U.S. patent application Ser. No. 12/315,129, filed Nov. 29, 2008, titled "A PRINTER INTERFACE FOR PRINTING DATA AND/OR RECEIPTS TO AND FROM HAND HELD DEVICES," claiming priority to Provisional Application No. 61/004,828, filed Nov. 30, 2007, the contents of which are hereby incorporated by reference in its entirety.

BACKGROUND OF THE INVENTION

The data that old systems contain is very valuable and needs to be used with modern day systems. It would be very costly and time consuming to try to redesign and reprogram all the old systems to output their data to modern day systems. It is equally or even more costly and time consuming to try to print the data to paper and then have to re-enter all the data into the new systems. Since existing printers were designed to output data to paper, they are considered a closed end system with data in and paper out.

SUMMARY OF THE INVENTION

Printers have always been "end of line devices". The only function of a printer is to print on paper. We have researched the patents and have found no patent that even remotely describes our invention of using a printer system to connect old systems to new modern day systems. The following patents come the closest with the "reuse of data" but even this is about reprogramming the existing system and transferring the data to another paper printer using a network. Our Invention does not change an existing system or use the network of any existing system. Using our invention, the existing system works exactly the same but can be connected to modern day systems by simply printing. From our research it seems that no one has thought to use a printer system to connect systems. The following are the patents that come the closest:

| USPTO# | Name | Date |
| --- | --- | --- |
| 7,423,773 | Saeki | Sep. 9, 2008 |
| 6,842,263 | Saeki | Jan. 11, 2005 |
| 7,352,487 | Tokashiki | Apr. 1, 2008 |
| 7,406,577 | Kaneda | Jul. 29, 2008 |

However, since the older computer systems are already programmed to output their data to paper, we have invented a way to "Print" this data automatically into new modern day systems. Using our new Printer System, we can now connect all old systems with modern day systems by just printing to our new "Data Printer System". This new Printer system will take the data from old systems and "Print" it to the internet and/or to databases and/or to hand held devices so it can be used in new systems.

This new and novel printer system will enable old systems that output data to paper to cause this information to be received from and transmitted to a consumer and/or computer network electronically. This data printer system can also print to and receive from the internet automatically.

The ability to do this will open up extremely fast data exchange and data manipulation. Access to this data was not possible before without redesigning and reprogramming all older computer systems.

Using this printer system, previous paper data and or receipts can be electronic and be digitally searched, sorted, categorized and totaled automatically. The data can be used in anyway necessary for accounting, taxes, product returns, rebates, warranties or any other use that may come up.

BRIEF DESCRIPTION OF THE DRAWINGS

FIG. 2 is an embodiment of a printer interface that is connected between a computer and a printer enabling a computer to connect to modern day systems.

FIG. 3 shows how a consumer may obtain a hand held device and how a consumer may receive settlement information on a hand held device after making a purchase.

FIG. 4 shows how a consumer may use the printer interface to transfer information to a hand held device enabling the consumer to engage in further transactions.

DETAILED DESCRIPTION OF THE INVENTION

Figure 1:
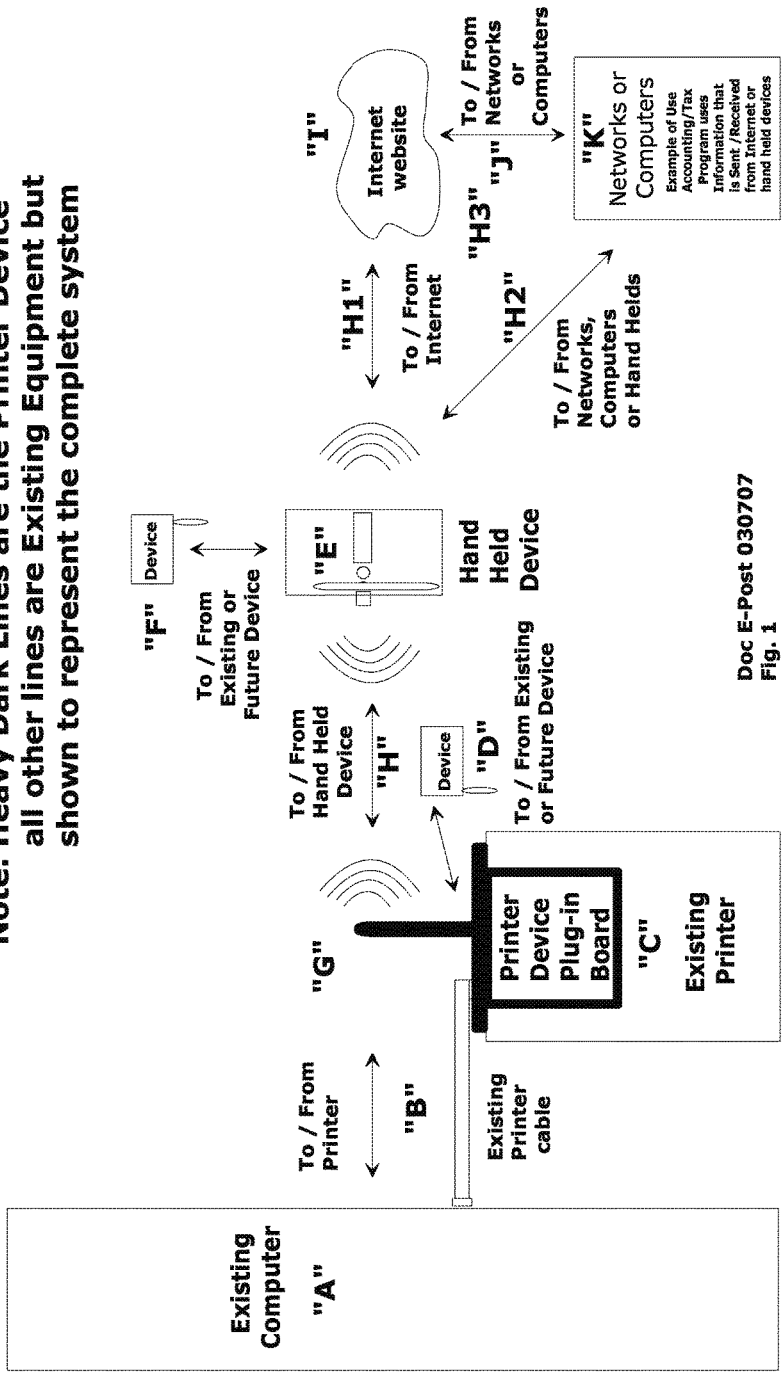
FIG. 1 is an embodiment of a printer interface that replaces a printer enabling a computer to connect to modern day systems.

This invention has many uses for connecting old paper output systems to modern systems, devices, databases and the internet. The following is only one detailed example of use that describes this invention but the example clearly shows how this invention can be used in other similar ways.

Existing printers print a receipt on paper for the consumer that represents the consumer's transaction. These receipts can get lost, torn, smudged, or turn black from too much heat causing them to be unreadable or unusable. Receipts are extremely important in proving the sale took place. They are important for returns, rebates, accounting, warranties and taxes.

The IRS demands a copy of the transaction as proof for deductions against taxes. If a taxpayer does not have a clear and readable receipt or copy, the taxpayer could be forced to pay more taxes than they actually owe. The other side is also true, with today's paper system there is no way to validate that the receipt is from the taxpayer. The IRS could be forced to accept a receipt that the taxpayer found or was given; therefore it is the Government that is loosing out on taxes owed.

This new system would be fair to all and would speed up audits and make it easier for everyone including the IRS, accountants and Taxpayers.

Another problem with receipts on paper is in accounting. Consumers end up with numerous shoe boxes full of receipts that they have to sort, categorize, and total and then have to manually enter these amounts in an accounting system or tax program for yearly taxes.

This is confusing, extremely inefficient, time consuming and costly, especially if the consumer has to pay an accountant to do the work. Since all receipts have totally different formats and layouts, it is very frustrating, difficult and time consuming to manually search for item names, item categories, store names, dates, times, amounts, taxes paid, locations of the establishment (especially if using out of town deductions), etc. Whereas Electronic sorting is almost instantaneous for all.

Transmitting and receiving this information to and from the consumer could be done in two basic ways. The first way is physically.

If sent physically then the consumer could carry A PORTABLE RECORD ORGANIZER device or (PRO) that would be able to receive and transmit information to and from the new printer system.

The advantage of this invention is that there is no need to reprogram or in any way modify the old system. There are two styles of the same invention shown. Style #1 (as depicted in FIG. 1) is the Interface installed into a new Printer so you can connect old systems to new modern day systems or the internet by simply replacing the Printer. FIG. 1 is an embodiment of a printer interface that replaces a printer enabling a computer to connect to modern day systems.

Style #2 (as depicted in FIG. 2) is the same interface that is connected between the old system and the old printer so you don't have to replace or modify anything. By simply adding the interface, you can use the old system and the old printer to connect old systems to new modern day systems or the internet. FIG. 2 is an embodiment of a printer interface that is connected between a computer and a printer enabling a computer to connect to modern day systems.

Therefore, I will describe the operation of Style 1 (as depicted in FIG. 1) which in turn will describe Style 2 (as depicted in FIG. 2) with the same references.

Referring to FIG. 1: The user will unplug the old printer "C" from the existing printer cable "B" and plug in the new printer system "G" into the existing printer cable "B". The system is unchanged but now has the capability to transfer data to and from the modern day systems or an internet website through wired or wireless pathway "H" and/or as an alternate pathway "H1" an internet/intranet interface "H2" and pathway "H3". The data can also be sent to a hand held device or card "E". A reader "F" could read a hand held device or card "E" to get the address of the computer or website to send the information to.

Please note that the data is transmitted in both directions from and to "E", "F", "D", "G", "H", "H1" "H2", "H3", "I", "J", "K" and also from "G", "B" and "A".

Once the data is on a modern day system or website "I", it can be accessed via pathway "J" from computer "K" which could be a federal, state or city computer, an accountant's computer or a personal computer. Note that by using the Portable Record organizer, a hand held device or a card "E" you can transport the modern day information manually from computers or websites to a detached computer "K".

Transmission in either direction to the new printer system could be through magnetic coupling, direct contact, new or existing specifications such as USB, Bluetooth and wireless networking, radio waves, cell phones, visible light, infra red or any other means new or existing that uses the magnetic spectrum.

The PRO (for example, as shown in FIGS. 3 & FIG. 4) works with the new printer system and could be any new or existing device (or card), an attachment to a device (or card) or even a software program for a new or existing device (or card). Some examples of these devices (but not limited to these) would be flash drives, memory cards, magnetic stripe cards, Smart cards, cell phones, PDA' or pocket computing devices.

FIG. 3 of 4 and FIG. 4 of 4 are described in the drawings. FIG. 3 shows how a consumer may obtain a hand held device and how a consumer may receive settlement information on a hand held device after making a purchase. FIG. 4 shows how a consumer may use the printer interface to transfer information to a hand held device enabling the consumer to engage in further transactions.

Note that in FIG. 4 of 4 we are using the PRO data as credit or payment though the printer system.

In the case of specially made device, it could be as simple as a modified flash drive or more specific such as a Portable Record Organizer (PRO) that could have special function buttons and a display and would be able to receive and/or transmit information to and/or from the new printer system which could itself transmit and receive from the internet, a network, an external location or even over the phone.

Some examples of the information received from the consumer could be Name, Address, City, State, Zip, Phone#, email address, credit card numbers, insurance numbers, social security numbers, business card information or any data that the consumer needs to give the seller, business person, company, friend or family member either at a location, over the phone, over the internet, from their personal computer or cell phone.

This of course would be protected from identity theft.

The second way is to transmit and or/receive information over the internet from or to the new printer system. This could be done by sending or receiving to or from a consumer's internet account or sending or receiving to or from a "record holding site: such as a "Receipt Bank" were the consumer could upload or download information to or from their personal computer and/or PRO device or cell phone and/or the new printer system when they need to use it for returns, warranties, rebates, accounting or taxes.

This will be done in a quick "stair step" fashion for fast adoption and use. We can implement a quick and easy printer system interface that will enable us to use the information that was previously going to existing printers without modification to the existing system or its software.

This will consist of a connecting a new printer system that would receive and/or transmit information coming to the new printer system and enable sending it to a Portable Record Organizer as described above. This interface could be in line with or inductively coupled to the existing system.

This interface could also include any other means of receiving the information from the existing system. The design and interface for the new printer system could also be licensed to printer manufactures to be incorporated into their printers thereby giving extra value to their printers.

Neither of these uses would change the existing older system operation but would enable the immediate connection to all new modern Systems throughout the world and allow the consumer to electronically transmit and/or receive their information physically on a Portable Record Organizer which is then downloadable to the consumers personal Computer.

The next step would be to transmit and/or receive this information to or from the internet where it could be uploaded, stored and downloaded by using a code card or other protection device connected to the new data printer and needed for identity theft. It can be accessed and used at any accounting office or location virtual or physical designated by the owner or even on the owners own personal computer.

This could be done simply by using the above mentioned physical devices. This device will connect to the internet and "Print" the receipt, rebate, warranty, and other information to or from a storage site on the internet or intranet.

The next step would be to license the technology to developers to enable them to transmit the receipt through the existing "credit card system" that is in use all over the world.

Note: Using the existing Credit Card terminals, existing systems and Credit Card and Gift Card infrastructure for uses different than what they were originally designed for is also being claimed as part of the patent.

Previous printers were designed to print a paper copy of data and/or receipts which causes a disconnect with modern day data manipulation. This printer can print data to and receive data from the internet and other modern day systems which will open up extremely fast data exchange and data manipulation for consumers, cities, states and the federal government without the expense of having to purchase complete new systems. By simply changing out an old printer we can connect all old computer systems with modern day systems that now have the ability to manipulate data automatically. Example: consumers and accountants no longer have to go through weeks of finding, sorting and compiling receipts of paper to do their taxes. The government can do extremely fast audits with far fewer auditors—automatically. Consumers pay only what they owe which can be collected immediately without a stressful audit for the consumer. The consumer can collect their refund immediately which is needed to stimulate the economy at this time.

What is claimed is:

1. A printout redirection system, requiring no alteration of the printout generating device, comprising:
   a first point-of-sale computer, generating printout information, wherein the printout information is sent for printout to an attachable printer;
   a first wired connection with a first side connected to the first point-of-sale computer and a second side configured to connect to an attachable printer, the first wired connection conveying the printout information;
   a printout redirector, comprising:
     a receiver connected to the first wired connection's second side and receiving the printout information from the first point-of-sale computer;
     a first wireless transmitter configured to transmit the received printout information directly to a first portable device; and
     a wireless receiver configured to receive printout authorization information directly from the first portable device; and
   a program running on the first portable device which, via a choice or setting in the program, redirects incoming printer information to at least one of a printer, mobile device, internet website, accounting website, second computer, and network accessible by the first portable device,
   wherein printout information from the first point-of-sale computer intended for the attachable printer can be wirelessly transmitted directly to the first portable device without requiring a modification to the first point-of-sale computer's printout information.

2. The printout redirection system of claim 1, wherein the first portable device also receives information from the at least one of a printer, mobile device, internet website, accounting website, second computer, existing credit card system, and network accessible by the first portable device.

3. The printout redirection system of claim 2, wherein the first portable device wirelessly transmits and/or receives information to/from at least one of an existing printer, mobile device, internet website, accounting website, second computer, and network or a future-added printer, secondary portable device, internet website, accounting website, second computer, and network device.

4. The printout redirection system of claim 3, wherein the transmitting and/or receiving is proceeded with a code comprised of at least one of an owner's ID code and destination code.

5. A printout redirection system, requiring no alteration of the printout generating device, comprising:
   a first point-of-sale computer, generating printout information, wherein the printout information is sent for printout to an attachable printer;
   a first wired connection with a first side connected to the first point-of-sale computer and a second side configured to connect to an attachable printer, the first wired connection conveying the printout information;
   a printout redirector, comprising:
     a receiver connected to the first wired connection's second side and receiving the printout information from the first point-of-sale computer;
     a first wireless transmitter configured to transmit the received printout information directly to a first portable device; and
     a wireless receiver configured to receive printout authorization information directly from the first portable device; and
   a program running on the first portable device which, via a choice or setting in the program, collects data from at least one of the incoming printer information, a printer, mobile device, internet web site, accounting web site, second computer, and network accessible by the first portable device,
   wherein printout information from the first point-of-sale computer intended for the attachable printer can be wirelessly transmitted directly to the first portable device without requiring a modification to the first computer's printout information.

6. The printout redirection system of claim 5, wherein the collected data is displayed and/or printed on the first portable device or mobile device or on a device accessible by the first portable device or mobile device.

7. The printout redirection system of claim 6, wherein the collected data is credit or coupon information, allowing a user of the first portable device or mobile device to pay or engage in further transactions.

8. The printout redirection system of claim 6, wherein the first portable device contains at least one of an RFID, magnetic swipe card, and NFC capable device.

9. The printout redirection system of claim 6, wherein the first portable device wirelessly transmits and/or receives information to/from at least one of an existing credit card system, printer, mobile device, internet website, accounting website, second computer, and network or a future-added printer, secondary mobile device, internet website, accounting website, second computer, and network device.

10. The printout redirection system of claim 1, wherein the printout redirector is in communication to another device having at least one of a wired or wireless input and/or output.

11. The printout redirection system of claim 1, wherein the system is proximal to the first point-of-sale computer.

12. The printout redirection system of claim 1, wherein the system utilizes communications through at least one of an Internet, local network, credit card communication network, and telephone phone network for the printout information.

13. The printout redirection system of claim 1, wherein the system is in communication with at least one of a record holding site and receipt bank, wherein at least one of a receipt, return, rebate, warranty and other information related to a transaction is stored in the record holding site or receipt bank.

14. The printout redirection system of claim 1, wherein the system enables data and or receipts to be electronic in form and is least one of automatically digitally searched, sorted, categorized, and totaled for use in one or more of accounting, taxes, product returns, rebates, and warranties.

15. The printout redirection system of claim 14, wherein the searching includes at least one of item names, item categories, store names, dates, times, amounts, taxes paid, and locations of establishments.

16. The printout redirection system of claim 1, further comprising, a receipts and/or payment information program on at least the first portable device and mobile device.

17. The printout redirection system of claim 5, further comprising, a receipts and/or payment information program on at least the first portable device and mobile device.

18. The printout redirection system of claim 1, wherein at least one of the first portable device and mobile device is configured to download or upload at least one of a program for accounting, tax, budgeting, and payment/credit, via authorization from an identity protection code or protection card.

19. The printout redirection system of claim 18, wherein the identity protection code or protection card permits access to software or data communicated through system.

20. A method for redirecting a printout from a printout generating device, requiring no alteration of the printout generating device, comprising:
   receiving via a wired connection to a printer output of a printout generating point-of-sale device, a printout information, the printout information being configured for printout to an attachable printer;
   wirelessly transmitting the received printout information directly to a first portable device via a printout redirector; and
   running a program on the first portable device with a redirection destination choice to a user of the first portable device;
   redirecting per the choice, the received printout information to at least one of a printer, mobile device, internet website, accounting website, second computer, and network accessible by the first portable device,
   wherein printout information is wirelessly transmitted directly to the first portable device via the printout redirector without requiring a modification to the printout generating point-of-sale device or the printout information.

* * * * *